UNITED STATES PATENT OFFICE.

WILHELM OSBORNE, OF MUNICH, GERMANY, ASSIGNOR TO THE FIRM OF CHEM. PHARM. LABORATORIUM "SAHIR" G. M. B. H., OF MUNICH, GERMANY.

FORMALDEHYDE COMPOUND AND PROCESS OF MAKING SAME.

988,733.  Specification of Letters Patent.  Patented Apr. 4, 1911.

No Drawing.  Application filed October 28, 1909. Serial No. 525,117.

*To all whom it may concern:*

Be it known that I, WILHELM OSBORNE, a citizen of the Austro-Hungarian Empire, residing at Munich, Kingdom of Bavaria, Germany, have invented certain new and useful Improvements in Formaldehyde Compounds and Processes of Making the Same; and I do hereby declare the following to be a full, clear, and exact description of the invention, such as will enable others skilled in the art to which it appertains to make and use the same.

The present invention relates to the art of preparing compounds of formic aldehyde with the carbohydrates and particularly the sugars.

It has been found, in dealing with the compounds of formic aldehyde with the sugars of the cane sugar group, that they are obtained in a dry condition with very great difficulty. In order to obviate this difficulty with compounds of this character it has been found necessary to add thereto supplements consisting of powdered sugar, haloid compounds of the alkali metals, tartrate of potassium and so forth. There is also known in the art a formic aldehyde compound of lactose, which compound can only be brought to complete dryness by directing a current of thoroughly dry air upon and through the same for a sustained period of time.

The object of the present invention is to produce a formic aldehyde compound of a sugar or carbohydrate which is not open to the above objections, and in the course of my experiments in this direction I have found that a compound of formic aldehyde with malt extract can be prepared which obviates this difficulty.

In the compound prepared according to my invention, which is to be described hereinbelow, no sustained current of dried air is necessary, nor are any further additions to the compound required to obtain it in a perfectly dry condition.

I have found that if malt extract is heated in a vacuum to from 60° to 70° centigrade together with formic aldehyde a solid pulverizable compound of malt extract with formic aldehyde is immediately obtained, that is to say, without any further drying steps or additions. The formic aldehyde may be combined with the malt extract either by adding thereto pure formic aldehyde or also by adding thereto a compound yielding formic aldehyde such as paraformaldehyde, also known as trioxymethylene. Any addition of a compound splitting off or yielding formic aldehyde to the malt extract is to be considered, for the purposes of this application, as the addition of formic aldehyde to malt extract or the treatment of malt extract together with formic aldehyde.

The new formic aldehyde compound yielded by this process is obtained in the form of a yellowish loose powder which, when dry, does not smell of formic aldehyde. This compound is readily soluble in water and hygroscopic, and at temperatures below 100° centigrade, as well as under the action of moisture, it splits off the formaldehyde. By these characteristics it is essentially distinguished from the known formic aldehyde compound of dextrin which latter is entirely insoluble in water and is not decomposed at 180° centigrade.

The chemical composition of the formaldehyde compound of malt extract is such that each molecule of the maltose contained in the malt extract is combined with five molecules of formic aldehyde. From the uniformity of composition of this new compound it is deducible that it is a strictly chemical compound. 100 grams of malt extract will invariably take up 35 grams of formaldehyde, corresponding to a content of 25.9% of formic aldehyde.

A direct chemical analysis to determine the content of formic aldehyde by titration with an iodin solution gave from 25.20% to 25.44%. Since the malt extract employed contained 75% of maltose, the calculation of the content of maltose, in case the same enters into a chemical combination, whose formula would be, $(C_{12}H_{22}O_{11}+H_2).5CH_2O$, will give a content of 23.8 per cent. for this formic aldehyde compound of malt extract. There is no doubt, therefore, that the maltose contained in the malt extract is combined with the five molecules of the formic aldehyde.

The following example which constitutes what I consider the preferred method of carrying out my invention, will serve to fully elucidate the same: 5 parts of dry malt extract are heated to 60° centigrade together with 7.5 parts of a 40 per cent. solution of formic aldehyde and thereupon the liquid is distilled off in a vacuum at from 60° to 70° centigrade. After the distillation is completed the formic aldehyde malt extract compound remains as a solid pulverizable mass. The evaporation to dryness of the mass may be effected in a vacuum-pan or in a vacuum drying apparatus in which the mass is held in trays. The content of the formaldehyde compound thus produced was found to be about 25.2% of formaldehyde. The malt extract employed contained about 75% of maltose and 13% of dextrin. By analysis, it was ascertained that this dextrin enters into a chemical combination with the formaldehyde which contains 23% of the latter. These two ingredients are, therefore, in the relative proportions of 77 parts dextrin to 23 parts formaldehyde. Of 100 parts of malt extract formaldehyde compound, 53.5 parts of maltose are hence combined with 22.3 parts of c. p. formaldehyde, and 9.8 parts of dextrin are combined with 2.9 parts of c. p. formaldehyde. The formaldehyde was entirely consumed for these compounds and the remaining ingredients were found to be unmixed or uncombined with formaldehyde. No free formaldehyde existed in the compound. The proportions given are by weight.

Instead of employing dry malt extract, a quantity of liquid or syrupy malt extract sufficient to yield 5 parts of dry malt extract may also be employed without essentially varying this process.

As before stated, the formic aldehyde may be added as pure formic aldehyde or as substance capable of splitting off formic aldehyde such as paraformaldehyde or trioxymethylene may be employed. The latter compounds when heated, and particularly when heated to the temperature given above, will be split up into simple formic aldehyde or yield formic aldehyde, and therefore their use in the above process is in fact the addition of formic aldehyde to the malt extract. It is to be remarked in this connection that a solution of formic aldehyde in water is not to be regarded as a simple unitary compound, but as a solution containing trioxymethylene with which, moreover, other products of polymerization may be mixed. A solution of this character, however, as observed above, will on heating be reduced to a solution of simply formic aldehyde.

The new compound is to be used as a medicine and, besides being readily obtained in a dry form, offers the further advantage that it unites with the well known expectorant and demulcent properties of malt extract the antiseptic action of the formaldehyde which readily separates therefrom.

It has been found advantageous in the treatment of sore throat, hoarseness and, generally, throat and bronchial troubles.

What I claim as new and desire to secure by Letters Patent is:—

1. The process which consists in adding to malt extract formic aldehyde and heating, and evaporating the resultant mass.

2. The process which consists in adding to malt extract formic aldehyde and heating and then evaporating the resultant mass in a vacuum while heating.

3. The process which consists in adding to malt extract formic aldehyde in the proportion of five molecules of aldehyde to one molecule of the maltose contained in the malt extract and heating, and then evaporating the resultant mass.

4. As a new composition of matter, a dry formic aldehyde compound of malt extract, not having the odor of formic aldehyde, readily soluble in water and splitting off formic aldehyde under the action of moisture and also below 100° centigrade.

5. As a new composition of matter, a formic aldehyde compound of malt extract in the form of a yellowish loose powder, not having the odor of formic aldehyde but splitting it off under the influence of heat and moisture, soluble in water and having the formic aldehyde combined with the maltose of the malt extract in the proportion of one molecule of the latter to five of the former.

6. As a new composition of matter, a dry formic aldehyde compound of malt extract, not having the odor of formic aldehyde, readily soluble in water, splitting off formic aldehyde under the action of moisture and also below 100° centigrade, and containing no free formic aldehyde.

In testimony whereof I hereunto affix my signature in the presence of two witnesses.

WILHELM OSBORNE.

Witnesses:
 LOUIS MUELLER.
 MATHILDE K. HELD.